നോ

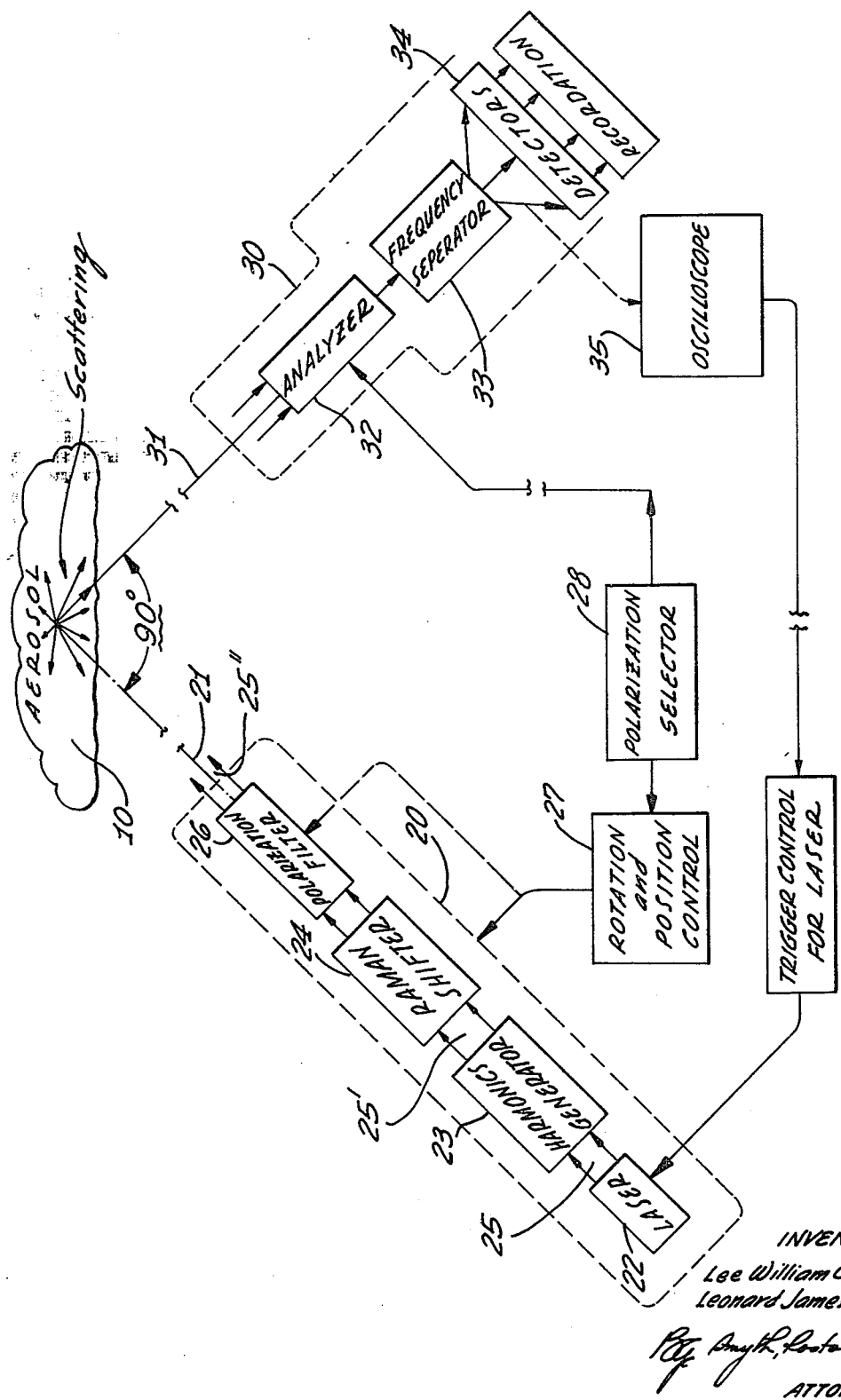

United States Patent Office 3,499,159
Patented Mar. 3, 1970

3,499,159
POLYCHROMATIC LASER AEROSOL SIZING AND RANGING (PLASAR) TECHNIQUE
Lee William Carrier, Temple City, Calif., and Leonard James Nugent, Oak Ridge, Tenn., assignors, by mesne assignments, to Xerox Corporation, a corporation of New York
Filed Jan. 23, 1967, Ser. No. 611,079
Int. Cl. H02f 1/28
U.S. Cl. 250—217                      9 Claims

ABSTRACT OF THE DISCLOSURE

A polychromatic laser beam is directed towards a cloud for different polarizations. The scattering radiation is detected for the individual frequencies and polarizations, preferably in a right angle plane.

---

The present invention relates to a method and system for the determination of the particle size distribution and of the range of an aerosol such as fog or cloud particles in the atmosphere, without requiring these determinations to be made in situ. More particularly the invention relates to a method and system for obtaining measured values from which the particle size distribution of such an aerosol can be calculated arithmetically.

In accordance with the present invention such data and measured values are produced by using a transmitter and a remotely positioned receiver. The transmitter provides a polarized probing beam comprised of a plurality of different, monochromatic radiation components to be directed towards the aerosol. The receiver detects radiation scattered by the aerosol and includes means for determining the intensities of the scattered radiation having retained the original polarization. The scattered intensities are detected individually for the several components of differing wavelengths.

The transmitter includes, as a basic power element, a laser providing a very high intensity monochromatic output beam. The laser may, for example, be a so-called giant pulsed ruby laser. It is basically immaterial, for the purposes of the invention, what type of laser is being used and whether it is operated in the pulsed or in the continuous wave mode. However the basic requirement for this active optical element is its capability of providing a high intensity or high energy beam. Furthermore the laser beam frequency and intensity must be such that additional radiation can be derived therefrom rather efficiently.

The laser beam is passed through one or more optically nonlinear devices deriving from the monochromatic laser beam additional components likewise having a high degre of monochromaticity. These nonlinear devices may be inside or outside of the laser cavity. In particular the nonlinear devices will include means for creating optical harmonics and within the range of usefulness these harmonics are Raman-shifted by another nonlinear device so that the composite output radiation beam includes a plurality of monochromatic radiation components having different wavelengths but each having a very narrow line width.

The transmitter for example the laser itself includes elements to provide for polarization of the electric vector parallel to a prescribed observation plane or perpendicular thereto. Therefore a measuring cycle will comprise at least one radiation pulse for each type of polarization, the polarization to be changed in between the two pulses. The two "pulses" pertaining to one measuring cycle do not have to be identical with two laser pulses. A measuring pulse may have any duration and may thus be comprised of any number of laser pulses or of a train or continuous wave outputs turned on and off for the duration of the desired measuring pulse length.

The observation plane can be defined by two optical axes. One of the optical axes is that of the transmitting system as aforedescribed. In particular, the transmitter beam having the several monochromatic components of differing wavelengths forms a very narrow-angle, polarized probe beam directed towards the aerosol sought to be investigated. This beam can be considered as having an optical axis along which it propagates. The other optical axis may intersect the transmitter optical axis at 90°, approximately at least, and is defined by the axis of the direction range of the receiver positioned remotely from the transmitter and detecting the radiation scattered by the aerosol at 90° from the direction of the probe beam.

The receiver is primarily designed to differentiate among the several components of the scattered radiation, scattering having occurred in the region of the cloud, where the probe beam intersects the receiver beam. First of all, the receiver determines the intensities of the scattered radiation individually for the several different wavelengths. Furthermore, and this is done preferably by way of sequential transmitter signals, the intensities for each of the wavelengths of scattered radiation and having retained a polarization in the observation plane are detected in one half of a measuring cycle. Intensities for the same wavelengths and having retained a polarization perpendicular to this plane are detected pursuant to transmission of a corresponding second probing beam in the second half of a measuring cycle.

These detected and measured values provide sufficient information to determine the size distribution of the particles in the aerosol responsible for the scattering. A beam of light passing through an aerosol is scattered by the aerosol in all directions. If the beam is polarized, at least some of the scattered radiation retains that polarization, but the intensity of the radiation (for a given aerosol) retaining the polarization after scattering in any direction depends on the type of polarization chosen for the probing beam. If the incident (monochromatic) radiation was polarized parallel to the observation plane, the scattered radiation of like polarization is very little dependent upon the scattering angle, as long as the light wavelength is longer than the radius of the largest particle (multiplied by $2\pi$). However, if the incident monochromatic radiation is polarized perpendicularly to that plane, the scattered radiation of like polarization has an intensity minimum at about 90° scattering angle.

For similar intensities of the initial beams (or known dissimilar intensities defining a correction factor), the ratio of the scattered intensities is a dimensionless quantity, which is also independent from intensities of the probing beams and from the volume of the aerosol involved ing producing the scattering radiation actually received. That scattering ratio is however a very sensitive criterion for the dependency of the depolarization by the scattering particles forming the aerosol on the type of polarizaton of the incident beam interacting with the particles. This dependency now is related strongly to the size of the particles involved and to the wavelength of the incident beam. Upon measuring the scattering ratios for as many different known wavelengths as feasible, the sizes of the particles of the aerosol can be deduced. Since the aerosol is composed of particles of different sizes, the measured values of the scattered intensities are integral effects for the scattering produced by differently sized particles. If, however, the size distribution is given by a statistical type characteristics determined by a few parameters, these parameters can arithmetically be determined from the measured values.

While the specification concludes with claims particularly pointing out and distinctly claiming the subject matter which is regarded as the invention, it is believed that the invention, the objects and features of the invention and further objects, features, and advantages thereof will be understood from the following description taken in connection with the accompanying drawing, in which there is shown somewhat schematically a transmitter and receiver system for determining the size distribution of particles forming an aerosol.

Proceeding now to the detailed description of the drawing, there is shown a receiver-transmitter system suitable for gaining data with the aid of which the size distribution of particles in an aerosol such as a cloud or fog area 10 in the atmosphere can be determined. The system is basically comprised of a transmitter 20 and of a receiver 30 positioned remotely from transmitter 20.

The transmitter 20 has a principal optical transmission axis 21 pointed towards the particle cloud 10. The receiver has a principal optical axis 31 likewise oriented towards the cloud 10 in a manner that the two axes 21 and 31 intersect, or come at least close to each other so that the solid angle as defined by the transmitter beam around axis 21 intercepts to a substantial degree the solid angle as defined by the receiver range developed around the axis 31 thereof.

More generally, the observation plane of interest is any plane substantially traversing the probe beam emitted by transmitter 20 and traversing also the detector range of receiver 30. Should beam and range not intersect, the term observation plane becomes meaningless as no meaningful signals could be picked up by the receiver. Within this degree of accuracy the two axes 21 and 31 are now regarded as defining the observation plane which is the plane of the drawing. Axes 21 and 31 intersect in that plane by an angle of about 90°. The observation plane as thus defined does not have to be a vertical plane. The distance of the receiver 30 from the transmitter 20 determines the height of cloud 10 by rules of triangulation.

The transmitter 20 has, as a primary source of radiation, a laser 22 which may be a giant ruby laser as this is one of the most powerful monochromatic light sources presently known. However, the laser may well be of another type, for example, a neodymium glass laser or a gallium arsenide laser. A pulsed laser is also preferred at this time because the energy density per unit time in a pulse is higher than can usually be obtained with a continuous wave technique.

For each measurement, i.e., for a measuring cycle needed to obtain a complete set of values about a particular location in the cloud 10, it is actually necessary to provide only two radiation pulses but this again can be regarded as a mere minimum requirement. For purpose of error averaging it may well be advisable to provide sequences of measuring pulses.

The laser beam is coupled out preferably by means of a collimating device to maintain a very narrow beam 25 at a small angle of divergence. This collimating device is included in the laser 22. In the preferred mode, the output coupler is of the Brewster angle type to polarize the electrical vector of the output beam in a particular plane. The beam 25 is then passed through a harmonics generator 23, for example, a transparent cell containing potassium deuterium phosphate (KDP). KDP is the presently known most efficient source to provide a rather strong second harmonics of a monochromatic light beam when passing through. Neither the original beam nor the second harmonic is substantially attenuated except that, of course, the energy of the second harmonic is derived from the incident beam. For an extensive treatment of the subject, a second harmonics generation, reference is made to a paper published by R. W. Terhun in "Solid State Design" 1963, page 38, "Nonlinear Optics."

The ruby laser, for example, produces a wavelength of approximately 6940 A. and a KPD cell as harmonics generator will convert efficiently in excess of 20% of the laser output into the second harmonics of 3470 A. Therefore, the light beam 25' leaving the generator 22 has now two distinct, monochromatic components, either of them being quite powerful. Moreover, the two components of the beam leaving the cell are polarized in the same plane.

Next, the beam 25' containing these two components is passed through a cell 24 containing an organic or inorganic liquid suitable to produce the phenomenon known as Raman shifting. The material may, for example, be benzene or bromobenzene producing for each line of the incident beam a plurality of Raman lines which are a few hundred Angstroms or less apart from the respective line of the incident light beam, as well as from each other. This distance between the Raman lines is equal to the molecular resonance frequency which is excited by the incident light. For the materials mentioned above Raman lines of higher as well as of lower frequency than the frequency of the incident light have been observed.

Presently the incident beam has two components, one being the laser output, the other one being the second harmonic thereof. For each of them a set of Raman lines are produced in the cell 24. In view of the fact that the molecular resonance frequency stimulated in the material by the incident light is way up in the infrared region, i.e., thermal noise, a relatively large band width of the resonance line itself does not affect the Raman lines, which are thus as highly monochromatic (narrow band width) as is the incident light itself. Therefore, the result of the Raman shifter 24 is a plurality of monochromatic lines, having quite dissimilar magnitudes but nevertheless being distinct and distinguishable monochromatic components of output beam 25".

A very powerful laser should be used as prime radiation source because it is desirable to obtain as many distinct monochromatic frequencies as possible but each of sufficient and useable power. The cascading of the nonlinear devices inherently produces a not too strong set of Raman lines derived from the second harmonic of the laser output. Nevertheless if the latter is powerful, even these Raman lines will be useful. Considerable radiation power is also needed particularly for the production of the second harmonics in the device 23, as it requires a very large electric field strength of the wave propagating through cell 23. For this reason it is advisable to let the laser beam be incident on the second harmonic generator directly and to Raman shift the output thereof. A reverse order, though principally possible, is inadvisable, since a Raman line itself is not very powerful, and thus the yield of a second harmonic generator when driven by a Raman line will be rather low.

The Raman lines of higher frequency are not necessarily colinear with the incident beam, but the divergence is so minute, that the resulting composite beam still is rather narrow, i.e., has a small solid angle. It should be observed that the elements 22, 23 and 24 are shown schematically in the drawing in a staggered or cascaded relationship, whereby in particular the two nonlinear optic devices 23 and 24 producing the additional components are external to the laser cavity. It should be mentioned, however, that either or both of these nonlinear optic devices 23 and 24 may be included in the laser cavity providing, of course, that the cavity is adjusted to sustain laser oscillations also in the modes as defined by the additional components produced in harmonics generator 23 and in Raman shifter 24 and provided further that the output coupler of the laser is transmissive to all these desired components.

The output beam as produced by means of the aforedescribed devices may then be passed through a polarization filter 26 to eliminate the radiation of any component in which the electrical vector does not oscillate in the desired plane. It should be observed that neither a polarizing output coupler of the laser nor a polarization filter 26 is required in principle as long as the output beam contains radiation components in which the electrical vector oscillates in the observation plane as well as perpendicular thereto. However, the above mentioned nonlinear device for generating harmonics requires for efficient operation a polarized input beam. Moreover, as little power as possible should be eliminated from the entire system merely by loss-filtering. Thus, the laser output coupler should be of the polarizing type. A filter 26 should be used only if it materially improves the signal-to-noise ratio of the entire system but it is unadvantageous to use the filter 26 for purposes of producing a polarized output out of a materially unpolarized input.

For practicing the invention it is desirable to produce at times a transmitter beam polarized parallel to the observation plane (plane of the drawing), as defined. In a second adjustable transmitter mode the beam should be polarized in a plane perpendicular to the observation plane. In order to obtain these two adjusting positions the entire transmitter 20 may be mounted for rotation about the optical axis 20, and a driving device 27 is provided to rotate the transmitter so that the orientation of the plane of polarization with respect to the observation plane can be changed in between the two desired positions. Alternatively, the laser polarization can be adjusted to be at an angle of 45°, or any known angle, to the plane of observation and the polarization filter used to appropriately select either the component parallel or perpendicular to the observation plane. This is symbolically indicated by the dashed linkage between control 27 and filter 26. For either case of polarization selection the transmitter station may include a polarization selector 28 for operating the control 27 and being also linked to the receiver via remote control lines or any other suitable transmission facility.

As was stated above, a measuring cycle can be defined by two pulses, one radiation pulse being polarized parallel to the observation plane and the other radiation pulse being polarized perpendicular to the observation plane. It is essential for practicing the invention that the power of each such measuring pulse be the same or that at least any differences in the resulting outputs are known and ascertainable. The output beam 25″ is now the output proper of the transmitter 20, and as stated repeatedly it should be a narrowly bundled beam directly towards the cloud 10. Additional means (not shown) can be provided to orient the direction of the output beam towards any desired point in the sky.

Having described the production of radiation to be transmitted, we turn now to the details of the interaction between radiation and cloud. For meteorological tests the particles of interest are now about $\frac{1}{100}$ micron up to 2 or 3 microns and can, to a high degree of approximation, be regarded as having spherical shape. This invention is in principle applicable for determining particle sizes above 3 microns depending upon the selected laser wavelength. The principal criteria is that the scattering be of the Rayleigh type, i.e., $2\pi r/\lambda > 1$ where $r$ is the radius of the largest particle.

The particles in the cloud 10 will scatter some of the radiation of the beam in all directions. The Mie theory for scattering to be valid requires the particles to be sphered, and the basic theory produces wavelength dependent scattering which are different for the two types of polarization. The theory further provides, and has been vertified experimentally, that the intensity of the radiation scattered from a light beam having its electrical vector polarized parallel to the plane of observation and retaining that polarization is only to a very minor extent dependent upon the scattering angle, whereas the intensity of light which is scattered from an incident beam polarized perpendicular to the plane of observation, and which retains that polarization, is highly dependent on the scattering angle; and is minimum for a scattering angle of 90°. Therefore, the radiation scattered from two beams of similar intensity but different polarizations as defined and retaining the respective polarizations will have intensities which for the 90° scattering directions are quite different. In addition, now, and this is essential for the utility of the devices described, this depolarization ratio is strongly dependent upon the wavelengths of the incident beams.

In particular, the intensities per unit solid angle of scattered monochromatic light having wavelength $\lambda$, scattering to occur by a single spherical particle of radius $r$ and at 90° from the direction of the incident beam, are $(\lambda^2/4_\pi^2) \cdot i_{\prime\prime}$ and $(\lambda^2/4_\pi^2) \cdot i_\perp$, where $i_{\prime\prime}$ and $i_\perp$ are the basic Mie functions for scattering at 90° and for polarizations of the incident beams respectively parallel to the plane of observation ($i_{\prime\prime}$) and perpendicular thereto ($i_\perp$). Either function ($i_{\prime\prime}$) and ($i_\perp$) is a function of $r/\lambda$.

If $f(r)$ is the distribution function of the particle sizes in the volume from which the scattered radiation will reach the receiver 30, then $f(r)\,dr$ is the number of particles having radius between $r$ and $r+dr$. Hence, the 90° scattered radiation of given wavelength and for the two types of polarization is respectively proportional to $$(\lambda^2/4_\pi^2) \cdot \int_0^\infty i_{\prime\prime} \cdot f(r)\,dr$$

and $$(\lambda^2/4_\pi^2) \cdot \int_0^\infty i_\perp \cdot f(r)\,dr$$

The proportionality factor is defined in either case by the intensity of the incident beam, by the actual volume of the portion of the cloud from which scattered radiation is actually received, by the number of particles in that volume, and by attenuation of the radiation along the travel path.

The volume and the number of participating particles is unknown, but these values can be assumed equal for the two cases, provided the two probing beams of differing polarizations are transmitted in short sequence so that the conditions in the inspection region do not change in between. The attenuation may differ, but only to a negligible degree. The intensities of the two differently polarized probing beams are presumed to be equal in the transmitter; should they be different, then the ratio of the intensities of the two transmitter beams defines a correction factor.

The ratio of the scattered intensities when formed is thus reduced to the ratio of the two integrals above and does not include the intensities of the incident beams of different polarizations, when equal, nor, most importantly, does the ratio include the volume from which scattering is observed. The scattering ratio is a function of the wavelength of the incident beam because the two Mie functions have $r/\lambda$ as variable and the integration is over $r$. The scattering ratio depends also on the parameters for the particle size distribution function $f(r)$. The integration eliminates $r$ as variable, but leaves the parameters.

Thus, by observing the two intensities of scattered radiation for the same wavelength and for either one of the two types of polarization in both incident beam and detected scattered radiation, a scattering ratio can be measured quantitatively. By using different wavelengths one obtains a measured, empirical relationship between discrete values of scattering ratios and discrete values of wavelength. The parameters of a particle distribution function can then be deduced quantitatively.

The probing beam 25″ transmitted by transmitter 20 includes a plurality of monochromatic components of differing wavelengths. By operation of the drive 27 the plane of polarization of the probing beam 25″ can be oriented parallel to the observation plane as well as perpendicular thereto, so that one can provide two differently polarized probing light pulses each including the same plurality of monochromatic components.

Scattered radition is received by the receiver 30. The receiver 30 is first provided with a position adjustable analyzer 32 so that the polarization of the probing beam agrees with the orientation of the plane of polarization for which the analyzer 32 is transmissive. The selector 28 causes the operation of the position adjustment for analyzer 32. Next in the optical path of the input of receiver 30 there is a frequency selector 33 of the spectroscopic type which separates the several components of differing wavelengths in the incoming beam from each other, so that the intensities of the individual components in the scattered beam can be detected individually. Finally, the transmitter 30 comprises a plurality of conventional light detectors 34, being, for example, of the photo multiplier type, to respond individually to the intensities of the several monochromatic components of incoming radiation.

It will thus be observed that for the several different wavelengths as transmitted and for the two different types of polarizations, one obtains a series of output values in the detectors 34. For each wavelength, there is a pair of measured values, differing from each other qualitatively by their respective polarizations, and therefore differ quantitatively because scattering depends on polarization. Out of each pair a ratio is formed and one obtains a series of scattering ratios as defined above, one each for the different wavelengths. The individual data may be recorded or stored, otherwise, multiplexed into a data acquisition device, etc. The subsequent utilization of these data is primarily a matter of computation and in view of the fact that the pertinent mathematical relations are rather nontrivial, evaluation by computer is more or less mandatory.

This quantitative evaluation concerns primarily the above mentioned integrals in which the arguments are the basic Mie functions $i_{\nu}$ and $i_{\perp}$ and the distribution function $f(r)$. It is actually the latter which is the "unknown" for this procedure. For a quantitative evaluation an assumption must be made and a reasonable approximation for aerosols generally accepted is $f(r) = (r - r_o) \exp$ $$(-(r-r_o)^3/s^3)$$

where $r_o$ is the radius of the smallest particle participating in the scattering and $s$ is related to the so-called width $w$ of the distribution curve at the half height by the relation $w = 0.9015s$. Therefore, the particle size distribution is known when the parameters $s$ and $r_o$ are known. The above defined scattering ratio thus is a known function of $s$, $r_o$ and $\lambda$ as variables (after integration over $r$). For discrete values of $\lambda$ scattering ratios have been measured as described above. For these values $\lambda$ one can develop (by computer operation) a family of curves for different parameters $s$ and $r_o$. With regard to the computations involved reference is made to A. F. Stevenson and W. Heller, "Scattering Function for Hetero-disperse Systems," Wayne State University Press, Wayne State University, Detroit, Michigan, 1961. By systematically varying the parameters the family of curves thus obtained can be superimposed upon the measuring values for the scattering ratios obtained with the aid of the system described above, to find the pair of parameters $s$ and $r_o$ the corresponding curve of which approximates these measured values best.

It will be appreciated that for the inventive method to work, the distribution function itself does not have to be known at all. One can assume other distributions, define pertinent parameters and by variation of the parameters again the curve to match best the empirically obtained data can then be found. This may be particularly relevant when the method and systems are being used to monitor the creation, distribution, etc., of fog, smog, etc.

The receiver 30 may further include an oscilloscope 35 receiving a timing signal directly from the transmitter, so that the timed occurrence of any receiver signal gives an indication of the travel time (and distance) of the probing signal. This may be of advantage if one of the two stations of this transmitter-receiver system is mobile. Furthermore, and in order to make sure that the radiation received results from 90° scattering, the receiver range should be oriented at a 45° angle relative to the line defining the shortest distance of receiver from the transmitter. It should be pointed out, that the detection of radiation scattered at a different angle does not invalidate the applicability of the method, but reduces the efficiency. The only real limitation is that one cannot use 180° scattering. Thus, the orientation of the receiver and the transmitter to each other is not of real criticality except, of course, the transmiter beam must intercept the detector range.

The occurrence of any receiver signal can then be used to make sure that the receiver range intercepts the transmitter beam. As the distance between transmitter and receiver may be variable, the time relationship between reception (via cable, separate radio communication, etc.) of the trigger signal from the transmitter and the reception of the scattered radiation is a value which, together with the orientation angles of transmitter and receiver, defines height and distance of the portion of cloud 10 probed. A direct measurement of the distance between receiver and transmitter is then not needed.

The invention is not limited to the embodiments described above, but all changes and modifications thereof not constituting departures from the spirit and scope of the invention are intended to be covered by the following claims.

We claim:
1. A system for providing measured values characteristically related to the sizes of substantially spherically shaped particles of a remotely located aerosol, comprising:
   a transmitter and a remotely positioned receiver, transmitter and receiver respectively having narrow intersecting transmission and detecting ranges defining at least one observation plane;
   the transmitter comprising a laser and at least one nonlinear optic means for providing a narrow angle, collimated beam comprised of a plurality of monochromatic components, the transmitter including means for selectively polarizing the beam in said observation plane and in a second plane prependicular thereto;
   the receiver comprising means for detecting for each of the wavelengths of the monochromatic components the intensities of radiation scattered from the region of intersection of said ranges and being polarized in said observation plane or in a third plane having the same angular relationship as said second plane has to said observation plane, the third plane being substantially perpendicular, to the axis of the detecting range.

2. A system as set forth in claim 1, said observation plane, said second plane and said third plane being oriented substantially at right angles to each other.

3. A system as set forth in claim 1, said nonlinear optic means including first means for providing a second harmonics of a selected laser beam frequency of said laser, and including second means for providing Raman frequency radiation from said laser beam frequency and from said second harmonics to form said narrow angle beam.

4. A system for providing measured values characteristically related to the size of particles in a remotely located aerosol, the particles having at least approximately spherical shape comprising:
   a transmitter including a laser for providing a narrow angle probing beam by stimulating active laser material and for direction towards a selectable location in the aerosol;
   nonlinear optic means in the path of the probing beam as provided by the laser so that the probing beam as modified by the nonlinear optic means includes a plurality of different wavelength components in addition to the particular wavelength produced by the stimulation of the active material in the laser;

means in the transmitter for selectivity polarizing the probing beam including a polarization parallel to a particular plane and including polarization perpendicular to the said particular plane;

and a receiver positioned to detect radiation scattered from the probing beam at a particular location and at 90° from the probing beam in said particular plane, the receiver including means for detecting the intensities of the scattered radiation having the polarization of the probing beam separately for each of said wavelength components.

5. A system for providing measured values characteristically related to properties of a medium in a particular location and providing for scattering of radiation, comprising:

a transmitter for transmitting a narrow beam of polarized radiation comprised of a plurality of monochromatic components of differing wavelengths, and for directing the beam towards the particular location; and, a receiver for detecting the radiation scattered by the medium from the location at a particular angle, individually for said wavelengths, the detected radiation having the same polarization as the polarization of the transmitted beam.

6. A system as set forth in claim 5, including means connected to the transmitter and to the receiver and being representative of the time between transmission of said beam and the time of detecting radiation scattered from the beam, to obtain information on the spatial relationship between said transmitter, said receiver and the region in the medium where the scattering occurred.

7. A method for obtaining information about the size distribution of particles in a remotely located aerosol, comprising the steps of:

producing a high intensity, monochromatic radiation beam;

deriving from the beam a plurality of additional monochromatic radiation components having wavelengths different from each other and from said radiation beams;

selectively polarizing the radiation beam and the additional components;

directing the polarized beam and components as a narrow angle probing beam towards the aerosol;

detecting radiation scattered by the aerosol from the beam at a particular angle and differentiating among the different frequencies and polarizations to produce values representative of scattering by the aerosol for the particular wavelengths and the selected polarizations; and computing from said values additional values quantitatively representative of the size distribution.

8. The method as set forth in claim 7, and comprising the additional steps of, providing a representation of the time a probing beam is directed; and providing a representation of the time scattered radiation is received, for obtaining information of the spatial relation between the point of direction, the point of detection and the aerosol.

9. A system for providing measuring values characteristically related to properties of a medium in a particular location and scattering radiation, comprising:

first means for transmitting polarized radiation of differing wavelengths and of distinctive monochromaticity toward the particular location and including second means for changing the plane of polarization;

third means responsive to radiation scattered from said transmitted radiation at said location and at a particular angle and providing discrete output values, respectively, representative of the intensities of the scattered radiation, for the different wavelengths and for different planes of polarization; and an analyzer included in the third means and being adjustable to assume different operating positions corresponding to the change in polarization as provided by the second means.

References Cited

UNITED STATES PATENTS 3,360,987 1/1968 Flower et al.
3,361,912 1/1968 Lundberg.

OTHER REFERENCES

Born and Wolf: Principles of Optics, 2d, Macmillan, 1964, p. 28.

D. L. Fried and G. E. Mevers: "Atmospheric Optical Effects Polarization Fluctuation," Journal of the Optical Society of America, vol. 55, No. 6, June 1965, p. 740.

S. P. S. Porto and D. L. Wood: "Ruby Optical Maser as a Roman Source," J.O.S.A., vol. 52, No. 3, March 1962, p. 251.

RALPH G. NILSON, Primary Examiner

C. M. LEEDOM, Assistant Examiner

U.S. Cl. X.R.

250—225; 356—102, 103, 117, 119